(12) United States Patent
Heuel

(10) Patent No.: US 9,345,319 B1
(45) Date of Patent: May 24, 2016

(54) CABLE MANAGEMENT APPARATUS

(71) Applicant: Carolina Heuel, Camarillo, CA (US)

(72) Inventor: Carolina Heuel, Camarillo, CA (US)

( * ) Notice: Subject to any disclaimer, the term of this patent is extended or adjusted under 35 U.S.C. 154(b) by 0 days.

(21) Appl. No.: 14/828,944

(22) Filed: Aug. 18, 2015

(51) Int. Cl.
*A47B 21/06* (2006.01)
*F16L 3/12* (2006.01)
*F16L 3/233* (2006.01)

(52) U.S. Cl.
CPC .............. *A47B 21/06* (2013.01); *F16L 3/1226* (2013.01); *F16L 3/233* (2013.01)

(58) Field of Classification Search
CPC ......... A47B 21/06; F16L 3/1226; F16L 3/233
USPC .......... 248/68.1, 339, 340, 58–61, 65, 72, 73; 211/85, 88.01
See application file for complete search history.

(56) References Cited

U.S. PATENT DOCUMENTS

| | | | | |
|---|---|---|---|---|
| 673,830 A * | 5/1901 | Wade | ....................... | B65G 7/12 294/26 |
| 954,840 A * | 4/1910 | Wiedemann | .......... | A45F 5/1046 190/102 |
| 1,086,442 A * | 2/1914 | Cornelius | ................. | F16L 3/14 24/17 A |
| 1,479,903 A * | 1/1924 | Erland | ...................... | A45F 3/22 294/142 |
| 1,925,295 A * | 9/1933 | Whiting | ............... | A45C 13/086 150/124 |
| 2,485,864 A * | 10/1949 | Cohen | ....................... | A45F 5/10 294/146 |
| 2,598,921 A * | 6/1952 | Knudsen | ................... | B66C 1/18 294/74 |
| 2,835,494 A * | 5/1958 | Hull | ...................... | A63B 65/125 473/511 |
| 3,133,576 A * | 5/1964 | Stines | ..................... | A45C 13/08 150/110 |
| 3,167,344 A * | 1/1965 | Applegarth | ............... | B66C 1/18 294/152 |
| 3,425,737 A * | 2/1969 | Sutton | ....................... | B66C 1/18 294/74 |
| 3,840,262 A * | 10/1974 | Foster | ....................... | B66C 1/18 294/74 |
| 3,992,048 A * | 11/1976 | Berzenye | .................. | B66C 1/18 294/74 |
| 4,118,028 A * | 10/1978 | Larkin | ................... | A63B 63/00 273/394 |
| 4,234,183 A * | 11/1980 | Stephens | .............. | A63B 67/002 473/505 |
| 4,378,617 A * | 4/1983 | Burns | ...................... | A01G 9/22 24/336 |
| 4,826,059 A * | 5/1989 | Bosch | .................... | A45C 11/24 206/350 |

(Continued)

*Primary Examiner* — Nkeisha Smith
(74) *Attorney, Agent, or Firm* — Gulf Coast Intellectual Property Group

(57) ABSTRACT

A cable management apparatus configured to be secured to a desk or similar structure wherein the cable management apparatus is operable to provide support and routing for a plurality of electronic cables. The cable management apparatus further includes a support plate. The support plate includes an outer surface having a plurality of hooks extending outward and upward therefrom. A support member is provide that is planar in manner and being manufactured from a flexible material. The support member is square in shape and includes an upper edge and a lower edge. A first group of apertures are present along the upper edge and a second group of apertures are proximate the lower edge of the support member. The support member is configured to have a plurality of openings arranged in a consistent pattern to allow a user to independently route one cable in an alternate direction.

6 Claims, 1 Drawing Sheet

(56) References Cited

U.S. PATENT DOCUMENTS

| | | | | |
|---|---|---|---|---|
| 4,938,484 A * | 7/1990 | Davis, Jr. | A63B 65/125 | 473/511 |
| 4,942,809 A * | 7/1990 | Simmons | A47J 43/18 | 383/117 |
| 5,110,219 A * | 5/1992 | Lopes | A45C 3/10 | 190/2 |
| 5,337,907 A * | 8/1994 | McKenzie | A45F 3/00 | 206/427 |
| 5,460,363 A * | 10/1995 | Tomer | A63B 71/0036 | 383/3 |
| 5,522,571 A * | 6/1996 | Simmons | F16L 3/14 | 248/59 |
| 5,600,098 A * | 2/1997 | Kazaks | H02G 3/0481 | 174/135 |
| 5,829,656 A * | 11/1998 | Reitz | B62B 9/26 | 224/250 |
| 5,836,839 A * | 11/1998 | Kay | A63B 65/125 | 473/511 |
| 5,909,833 A * | 6/1999 | Smith | A45F 3/02 | 224/577 |
| 5,964,434 A * | 10/1999 | Lynch, Jr. | H02G 7/10 | 248/317 |
| 6,250,470 B1 * | 6/2001 | Mackenzie | A01K 97/08 | 190/109 |
| 6,349,904 B1 * | 2/2002 | Polad | F16L 3/137 | 24/16 PB |
| 6,581,885 B2 * | 6/2003 | Polad | F16L 3/137 | 24/16 PB |
| 6,732,863 B2 * | 5/2004 | Speck | A63B 55/00 | 150/113 |
| 6,763,986 B2 * | 7/2004 | Santos | A45C 9/00 | 224/275 |
| 6,959,898 B1 * | 11/2005 | Laughlin | F16L 3/26 | 248/58 |
| 7,316,580 B1 * | 1/2008 | Walker | H01R 13/6392 | 439/369 |
| 7,455,178 B2 * | 11/2008 | Miller, Jr. | A45C 11/00 | 190/125 |
| 7,478,500 B1 * | 1/2009 | Pollock | A01K 97/06 | 206/315.11 |
| 7,785,008 B2 * | 8/2010 | Schoenig | A45C 13/002 | 294/214 |
| 7,814,590 B2 * | 10/2010 | Powell | A47C 21/00 | 5/503.1 |
| 8,235,331 B2 * | 8/2012 | McIntosh | F16L 3/02 | 138/107 |
| 8,668,083 B1 * | 3/2014 | Meil | A45C 11/26 | 190/107 |
| 9,115,969 B2 * | 8/2015 | Goodwin | F42B 39/26 | |
| 2003/0062328 A1 * | 4/2003 | Millard | A63B 71/0045 | 211/85.7 |
| 2004/0099426 A1 * | 5/2004 | Bryl | H02G 15/18 | 174/350 |
| 2005/0062370 A1 * | 3/2005 | Miller | A47B 21/0314 | 312/208.1 |
| 2005/0189453 A1 * | 9/2005 | DeGuevara | H02G 3/305 | 248/68.1 |
| 2007/0053616 A1 * | 3/2007 | Plouff | A45C 11/20 | 383/22 |
| 2007/0138050 A1 * | 6/2007 | Dominey | B25H 3/003 | 206/702 |
| 2008/0277952 A1 * | 11/2008 | Inkel | B66C 1/18 | 294/74 |
| 2011/0211775 A1 * | 9/2011 | Worthington | B31B 19/00 | 383/7 |
| 2013/0037591 A1 * | 2/2013 | Ostenbridge | A45C 3/00 | 224/607 |
| 2013/0216158 A1 * | 8/2013 | Meldeau | A45C 3/04 | 383/24 |
| 2013/0270409 A1 * | 10/2013 | Osorio | A45C 13/30 | 248/340 |
| 2014/0016881 A1 * | 1/2014 | Loudenslager | A45C 13/26 | 383/13 |
| 2015/0187460 A1 * | 7/2015 | DeLoache | H02G 3/266 | 248/68.1 |

\* cited by examiner

CABLE MANAGEMENT APPARATUS

PRIORITY UNDER 35 U.S.C SECTION 119(e) & 37 C.F.R. SECTION 1.78

This nonprovisional application claims priority based upon the following prior United States Provisional Patent Application entitled: Cable Management Apparatus, Application No. 62/041,110 filed Aug. 24, 2014, in the name of Carolina Heuel, which is hereby incorporated by reference for all purposes.

FIELD OF THE INVENTION

The present invention relates generally to electronic device cable management, more specifically but not by way of limitation, a cable management apparatus that is operably coupled to a structure such as but not limited to a desk that facilitates the management and routing of a plurality of cables associated with electronic devices.

BACKGROUND

Electronic devices have proliferated into almost every facet of our lives. We utilize computers at work and at home both. Most homes have at least two computers and additionally have other types of electronic equipment such as but not limited to televisions and stereo equipment. The aforementioned electronic equipment typically requires a plurality of wires for each device. By way of example but not limitation, a typical computer will have a power cord, a network cable and can further have additional output and/or input cables. Stereo equipment typically also has a plurality of cables such as but not limited to power cables and speaker cables.

One problem with existing electronic equipment is the over abundance of cables required for each one. Whether it is at a desk or within an entertainment center, the routing and management of these cables has proven to be challenging. Conventional methods include utilization of items such as but not limited to cable ties. User's will typically utilize a cable tie to bundle all of the adjacent cables in order to try to maintain some sort of order. One problem with the utilization of cables ties is that they do not provide support of the cables not do they allow a single cable from the group of cables that have been bundled to be routed in an alternate direction.

Accordingly, there is a need for a cable management apparatus that is operable to secure to a conventional furniture structure such as but not limited to a desk wherein the cable management apparatus includes a flexible support member that is operable to facilitate the support and routing of a group of cables and further allow at least one cable of the group of cables to be routed in an alternate direction.

SUMMARY OF THE INVENTION

It is the object of the present invention to provide a cable management apparatus that is operable to couple to a desk or similar structure that includes support plate wherein the support plate is configured to secure to a conventional desk or similar structure.

Another object of the present invention is to provide a cable management apparatus that is operable to provide support and routing of a plurality of cables wherein the support plate further includes a plurality of hooks extending outward from the support plate.

A further object of the present invention is to provide a cable management apparatus that is operably secured to a desk or similar structure that includes a support member wherein the support member is planar in manner and flexible and wherein the support member is manufactured having a open net style pattern.

Still another object of the present invention is to provide a cable management apparatus operable to provide support and routing of a plurality of cables associated with an electronic device wherein the support member is square in shape and includes a plurality of apertures along a first edge and a second edge of the support member.

An additional object of the present invention is to provide a cable management apparatus operable to support and route a plurality of electronic cables wherein the support member is manufactured from a flexible durable material such as but not limited to rubber or plastic.

Yet a further object of the present invention is to provide a cable management apparatus configured to secure to a desk or similar structure wherein the support member includes a first position and a second position.

Another object of the present invention is to provide a cable management apparatus that is secured to a desk or similar structure that is configured to provide support and routing of a plurality of cables wherein the configuration of the support member allows a cable from the group of cables engaged therewith to be routed in an alternate direction.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
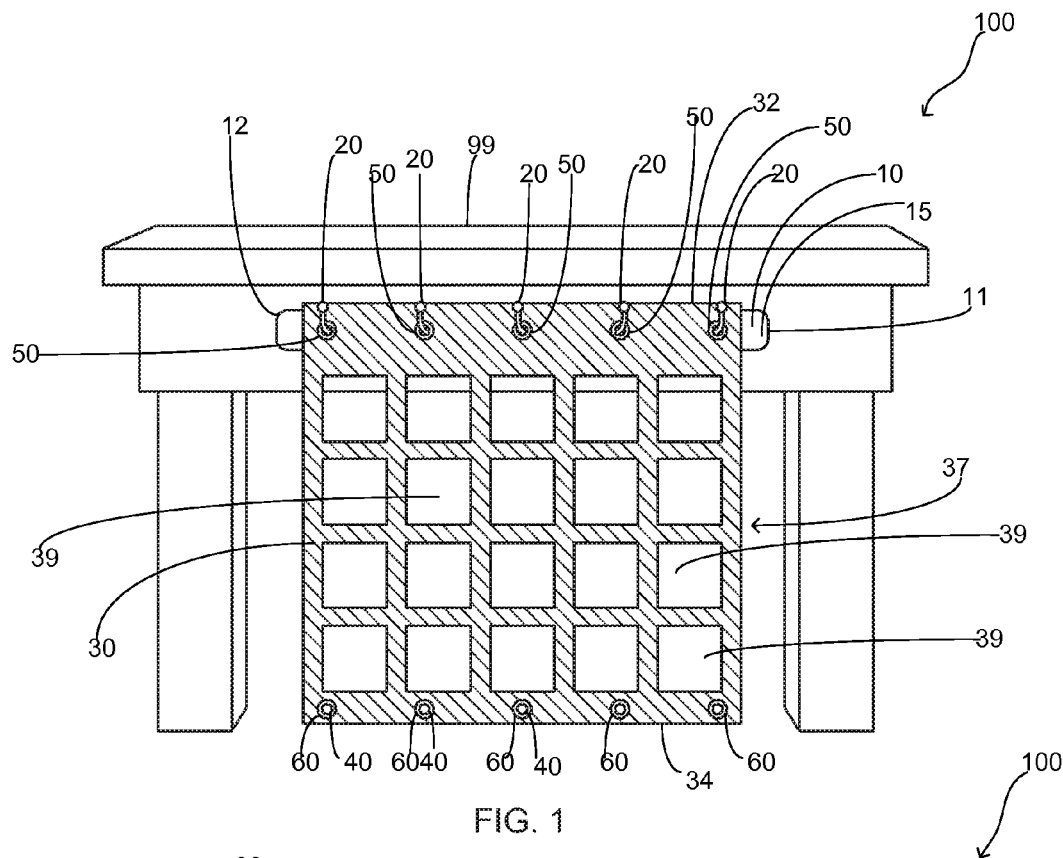
FIG. 1 is a perspective view of the preferred embodiment with the support member in its first position.
Figure 2:
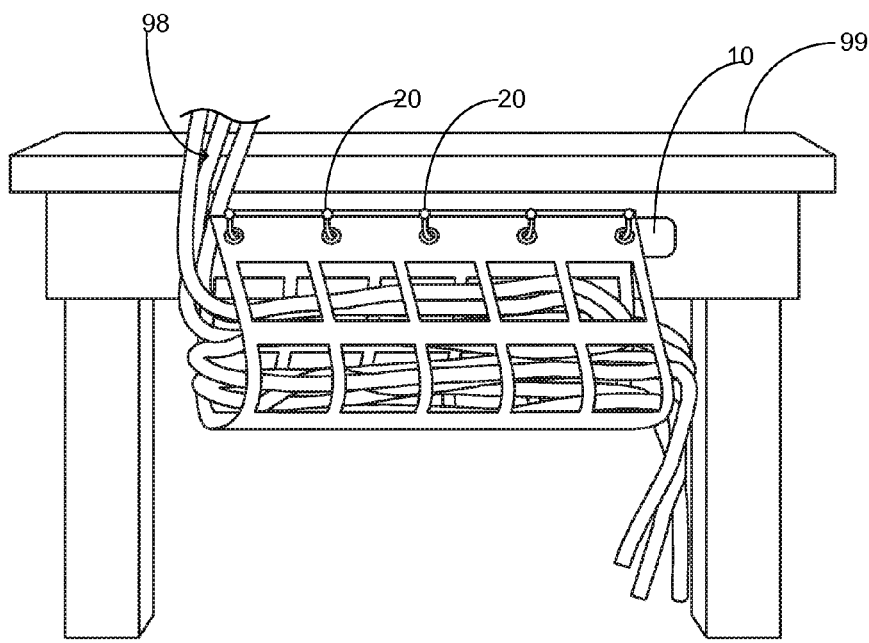
FIG. 2 is a perspective view of the preferred embodiment with the support member in its second position.

Referring now to the drawings submitted herewith, wherein various elements depicted therein are not necessarily drawn to scale and wherein through the views and figures like elements are referenced with identical reference numerals, there is illustrated a cable management apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1, the cable management apparatus 100 includes a support plate 10. The support plate 10 is rectangular in shape having a first end 11 and a second end 12. The support plate 10 is manufactured from a suitable durable material such as but not limited to plastic or metal. The support plate 10 is secured to the exemplary desk 99 utilizing suitable durable chemical and/or mechanical techniques. It is contemplated within the scope of the present invention that the support plate 10 can either be permanently secured to an exemplary desk 99 or similar structure or be releasably secured thereto. The support plate 10 includes outer surface 15 that is oriented so as to be directed away from the exemplary desk. Secured to the outer surface 15 of the support plate 10 are a plurality of hooks 20. The hooks 20 are secured utilizing suitable durable techniques. The hooks 20 extend perpendicularly outward from the support plate 10 and further have a portion that extends in a generally upward direction. The hooks 20 are operable to engage with the apertures 40 of the support member 30 as further discussed herein. While five hooks 20 are illustrated herein, it is contemplated within the scope of the present invention that the support plate 20 could have numerous different quantities of hooks 20 secured thereto.

The support member 30 is illustrated in its first position in FIG. 1 herein. The support member 30 is manufactured from a durable flexible material such as but not limited plastic or rubber. The support member 30 is square in shape and includes an upper edge 32 and a lower edge 34. The support member 30 is suspendedly mounted on the hooks 20 in its first position with the first group of apertures 50 be engaged with hooks 20 as shown in FIG. 1 herein. The support member 30 includes a body 37 that is manufactured to have a plurality of openings 39. The openings 39 create a body 37 that resembles a net style pattern wherein the openings 39 are arranged in a relatively consistent pattern in both directions on the body 37. The body 37 is structured so as to include the plurality of openings 39 so as to allow a user to route an exemplary cable 98 therethrough upon a need to direct the cable to an alternate device in a different location. While no particular size of the openings 39 are required, good results have been achieved utilizing openings 39 that are approximately two inches in width. Furthermore, while the openings 39 are illustrated herein as being square in shape, it is contemplated within the scope of the present invention that the openings 39 could be formed in various different shapes and be present in different quantities and patterns.

A second group of apertures 60 are present along lower edge 34. The second group of apertures are in general axial alignment with the first group of apertures 50 so as to facilitate the maintenance of a square alignment of the support member 30 subsequent being placed in its second position. In its second position, the support member 30 has been folded upward so as to provide a cradle for the exemplary cables 98. It is contemplated within the scope of the present invention that the support member 30 could be manufactured in numerous different sizes so as to accommodate different quantities of cables. While the cable management apparatus 100 has been illustrated herein being secured to an exemplary desk, it is contemplated within the scope of the present invention that the cable management apparatus 100 could be secured to various types of furniture.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A cable management apparatus operable to be secured to a desk or similar structure wherein the cable management apparatus functions to provide routing and support for a plurality of electronic cables and wherein the cable management apparatus is configured to allow at least one cable to be routed in an alternate direction comprising:

a support plate, said support plate being rectangular in shape, said support plate having a first end and a second end, said support plate having an outer surface said support plate being secured to a desk;

a plurality of hooks, said plurality of hooks being secured to said support plate intermediate said first end and said second end, said plurality of hooks extending outward and upward from said support plate;

a support member, said support member being planar in manner and flexible, said support member being square in shape and having an upper edge and a lower edge, said support member configured to have a first position and a second position, said support member having a body wherein the body includes a plurality of openings organized in a pattern of adjacent rows, said support member being releasably secured to said support plate;

a first group of apertures, said first group of apertures being adjacent the upper edge of the support member, said first group of apertures operable to engage with said plurality of hooks;

a second group of apertures, said second group of apertures being proximate said lower edge of said support member; and wherein said support member has a first position and a second position and in said first position, the first group of apertures are operably coupled with said plurality of hooks.

2. The cable management apparatus as recited in claim 1, wherein the openings of said body of said support member are square in shape and have a width of approximately two inches.

3. The cable management apparatus as recited in claim 2, wherein the openings facilitate an ability to route at least one cable in an alternate direction from a group of cables engaged with said support member.

4. The cable management apparatus as recited in claim 3, wherein said first group of apertures and said second group of apertures are in axial alignment.

5. The cable management apparatus as recited in claim 4, wherein in said second position of the support member, the first group of apertures and the second group of apertures are operably coupled with said plurality of hooks.

6. The cable management apparatus as recited in claim 5, wherein said support member is manufactured from plastic.

\* \* \* \* \*